March 25, 1930.  F. JEREMIASSEN  1,751,740
PROCESS OF SEPARATELY RECOVERING SOLUBLE SUBSTANCES
IN A COARSE GRANULAR CONDITION
Filed Dec. 24, 1925
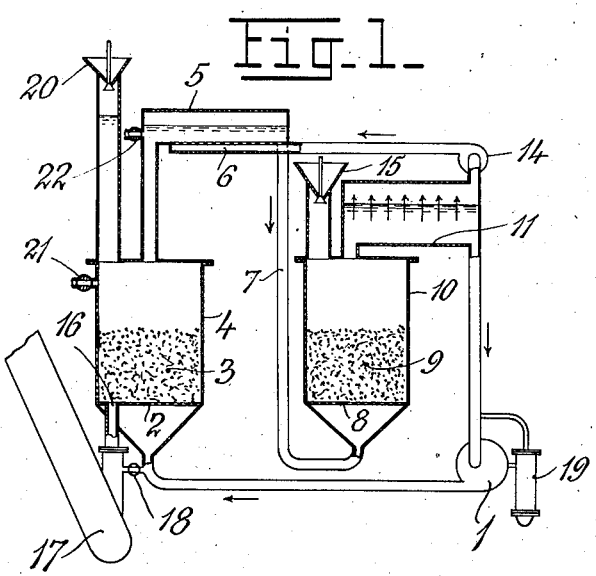
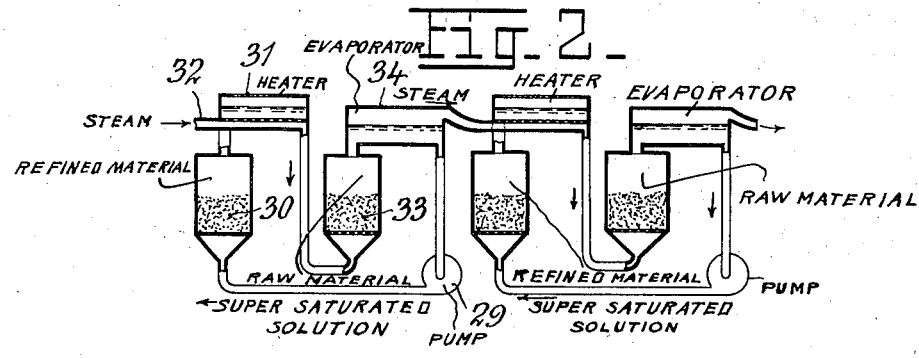
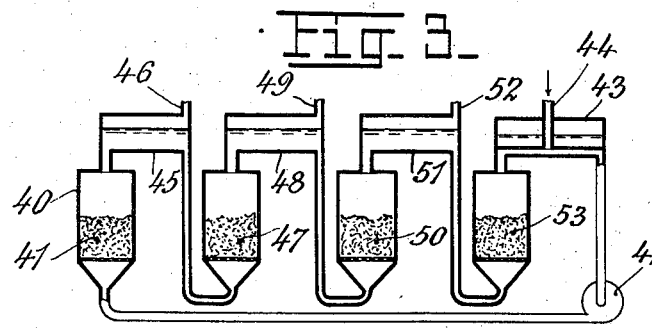
F. Jeremiassen
INVENTOR
By: Marks & Clerk
attys Patented Mar. 25, 1930

1,751,740

UNITED STATES PATENT OFFICE

FINN JEREMIASSEN, OF OSLO, NORWAY, ASSIGNOR TO A/S KRYSTAL, OF OSLO, NORWAY

PROCESS OF SEPARATELY RECOVERING SOLUBLE SUBSTANCES IN A COARSE GRANULAR CONDITION

Application filed December 24, 1925, Serial No. 77,579, and in Norway January 12, 1925.

The present invention has for its purpose to provide a process of refining soluble substances or separating from one another two or more soluble substances.

In the following the invention is described with reference to the annexed diagrammatical drawing showing apparatus, by means of which the invention may be carried into effect.

Figure 1 illustrates diagrammatically an apparatus which, among other things, is adapted for the refining of rock-salt.

Figures 2 and 3 show diagrammatically other embodiments of suitable apparatus.

In the example shown in Figure 1, 1 designates a centrifugal pump forcing supersaturated salt solution (brine) through a perforated bottom 2 and through a collection 3 of granules of sodium chloride which are maintained in suspension above same within the vessel 4. Hereby the supersaturation of the brine will be more or less completely given off because sodium chloride precipitates on the granules of the collection 3. The solution which is now only to a small degree supersaturated passes on through the vessel 5. In this vessel steam is forced through holes in a pipe 6 into the liquid and is condensed therein.

The solution which is thereby heated and somewhat diluted passes further through the pipe 7 and through a perforated bottom 8 up into the vessel 10. When passing through a collection 9 of rock-salt granules it becomes approximately saturated.

By giving off steam in the evaporator, it becomes again supersaturated but not fully up to the meta-stable limit.

While this supersaturated solution passes through the pump 1 back to the vessel 4 and through the collection 3 of sodium chlorid granules, the steam produced in 11 is compressed by a compressor 14 and, as mentioned above, forced through a perforated pipe 6 into the solution within the vessel 5 and condensed therein.

Through the hopper 15 which may be closed, rock-salt is supplied to the vessel 10 according to requirement.

When the sodium chlorid granules of the collection 3 have attained the desired size, they will sink through the aperture 16 down into an elevator 17. Through a cock 18 an adjustable stream of liquid is passed up through the aperture 16, whereby too small granules of sodium chloride cannot fall out.

After the process has been in operation for some time the solution circulating within the apparatus will be saturated also with regard to all foreign substances contained in the rocksalt. Hence, no more of these foreign substances will go into solution, the circulating liquid being only alternately undersaturated and supersaturated with said substances.

Usually a precipitation of these substances will not take place, because no collection of granules of the same substance is present to take up the supersaturation which in most cases will not pass beyond the meta-stable limit.

Such foreign substances are frequently contained in the raw-material in a finely divided state. After saturating the liquid they will, therefore, be carried along to a device 19 of known construction for the removal of fine granular material by means of centrifugal force, by gravity or by filtration. As a rule it is sufficient to pass only a portion of the circulating solution through the device 19, the removal of large quantities of fine granular substances being only seldom involved.

If these foreign substances should in some cases be precipitated, the final result will be the same one nevertheless, viz: the finely divided precipitations are removed through the removing device 19.

The process set forth above is a novel combination of the following known elements:

1. A solution being in forced circulation within an apparatus is alternately undersaturated before being brought in contact with the substance to be dissolved, and supersaturated so that the dissolved substance is precipitated.

2. The supersaturation is caused by evaporation of a proportion of the solvent and the undersaturation by condensation of the solvent in the form of vapour.

3. Substances are precipitated in a coarsegranular form from a solution by supersaturating same at one place, after which the supersaturation is given off at another place by passing the solution through collections of granules of the substances to be precipitated in a coarse-granular form.

4. The separation of the substance or substances to be recovered, from the other ones which in most cases are contained in the raw-material in a finely divided state and are carried along with the stream of liquid, is made perfect by passing a larger or smaller portion of the circulating solution through a removing device of a known construction.

The combination involves great advantages over the methods hitherto known.

If the supersaturated solution is not at all passed through a collection (3) of granules of the substance B which it is desired to produce in a pure state, as is the case with one group of the known methods, it is necessary to work with degrees of supersaturation above the meta-stable one, because otherwise it is not possible to obtain anything precipitated.

But in such a case not only the substance B precipitates but usualy also foreign substances from which it is to be separated. Or the foreign substances are more or less carried along undissolved by the stream of liquid. All substances contained in the raw-material A to be refined, main substances B as well as foreign ones, will then be present together in the stream of liquid and in a finely divided form. Consequently, the different substances are not obtained separated from one another, but a finely divided mixture of all of them is obtained as a final product.

If, therefore, an intensive operation is to be carried on by means of the now used methods, the purpose is in fact, very unsatisfactorily attained.

The second group of known methods for crystallizing-out, wherein the solution is first supersaturated, although under the meta-stable limit, and then passed through a collection of granules of the substance to be precipitated in a coarse-granular form, had not yet been utilized for the refining of substances by means of a circulating stream of liquid which is alternately supersaturated and undersaturated.

Furthermore, it had not been utilized in combination with the principle known per se that the solution becomes supersaturated by evaporating a portion of the solvent and undersaturated by vapour from the solvent being condensed.

The refining of a substance (here rock-salt chosen as an example) is a reversible process which, theoretically, should not require any consumption of energy. If, by the combination mentioned above, and by means of very large surfaces in the collections of granules, provision is made for the supersaturation of the circulating solution being reduced to a minimum after the solution has passed through the collections 3 of granules and if further provision is made for the undersaturation in the solution being also very low after it has passed through the collection 9 of granules, then one has arrived a step closer to the theoretically reversible refining process than by any other known method.

The present invention may also be utilized for recovering more than two substances simultaneously in a coarse-granular form from a mixed product. In such a case instead of the collection 3 indicated in Figure 1, collections of granules of the different substances to be separated are arranged above one another, each upon a bottom or in one of the other manners known from apparatus for the simultaneous separation of several substances from a solution.

Instead of compressing the steam by means of a compressor and utilizing it again in a circuit as described in connection with Figure 1, the principle of the so-called multi-stage evaporators may for instance also be utilized. Figure 2 shows diagrammatically an arrangement which may be used for instance for the same purpose as Figure 1, viz: for the refining of rock-salt.

A pump 29 forces supersaturated solution of sodium chloride through a collection of sodium chloride granules up into a vessel 31, wherein it becomes diluted and heated by condensation of steam passing out from holes in a pipe 32. On its further way through a collection of rock-salt granules 33 the solution becomes approximately saturated, and in a vessel 34 it becomes again supersaturated by giving off steam. Through the pump 29 the solution then returns to the crystallization vessel 30, whereas the steam produced in the vessel 34 passes on to the second group of apparatus, where everything is repeated exactly as in the group 29 to 34, only at somewhat lower temperatures and steam pressures.

From the second group of apparatus the steam may pass either to a third and fourth group etc. or may be compressed and returned to the first group through a conduit 32, or finally it may be utilized for other purposes such as, for instance, for heating.

The arrangement for the supply of new raw-material and new crystallization-kernels, as well as for the removal of finished crystals and of finely divided suspended substances, may be constructed as indicated in Figure 1.

If it is less important to save solvent and if large quantities of steam can be utilized rationally after having left the crystallization-apparatus, the arrangement illustrated in Figure 2 may be somewhat simplified.

The plant may for instance be constructed as indicated diagrammatically in Figure 3.

In vessel 40 there is arranged a layer 41 of the raw-material to be dissolved or lixiviated. By means of the pump 42 the solution is forced through this layer after having been heated and diluted in vessel 43 by condensation of steam which is supplied through pipe 44.

From vessel 40 the solution passes in approximately saturated condition into evaporator 45. The steam produced therein escapes through pipe 46, whereas the solution which is now supersaturated passes through a layer of crystals 47 of the substance to be precipitated in coarse-granular form, and then up into evaporator 48. The steam produced therein escapes through pipe 49, whereas the solution in the same manner as just explained is conducted further through crystal layer 50, evaporator 51 and crystal layer 53, in order to return through vessel 43 and pump 42 and to commence anew its circuit.

The steam conducted off through 46, 49 and 52 may be used for instance for some heating purpose.

The arrangement for the supply of new raw material and new crystallization kernels, as well as for the removal of finished crystals and of finely divided substances, may be constructed as indicated in Fig. 1.

Sometimes it may be advantageous for some reason to work with a lower pressure in the steam compartments than that of the atmosphere. In such a case the vessels for evaporation and condensation may in all of the arrangements shown in the drawings (5 and 11 in Figure 1, 31 and 34 etc. in Figure 2; 43, 45, 48 and 51 in Figure 3) be arranged so much elevated above the dissolving and crystal vessels (10 and 4 in Figure 1; the vessels with the collections 30, 33 etc. in Figure 2; the vessels with the collections 41, 47, 50 and 53 in Figure 3) that these latter will be subjected to a partial vacuum on account of the static pressure of liquid.

Among other things this arrangement involves the advantages that the vessels can be made lighter, if they are of large dimensions and that no air can be drawn in at large tightening surfaces which are difficult to maintain in a good condition as for instance at man holes and at supply hoppers for raw-material.

The arrangements shown are to be considered only as examples and may also vary much as to details. For instance, especially if it is a question of raw-material containing a great amount of insoluble substances, one can use two or more dissolving vessels in order that one or more of them may be placed out of operation to be emptied and filled again without the necessity of interrupting the operation completely.

In a dissolving vessel two or more perforated bottoms may also be mounted one above another and raw-materials which have been lixiviated to different degrees may be placed upon the bottoms in order that the most undersaturated liquor will lixiviate the poorest raw-materials.

Further, it may happen for instance that it is not desired in an arrangement according to Figure 1 to let the same solution circulate for an unlimited time. If, for instance, the raw-material in 9 in addition to sodium chloride also contains magnesium chloride a part of the solution may be conducted off at 21 and be replaced by water supplied at 22 so that a too high concentration of magnesium chloride in the circulating solution may be avoided.

I claim—

1. A process of separately recovering soluble substances in a coarse granular form from solid mixtures of substances which comprises forcing a solvent through a body of subdivided solid mixture, supersaturating the resulting solution by evaporating solvent therefrom, passing the supersaturated solution into and through a collection of granules of the kind of substance to be separately recovered, passing the solution away from said collection of granules of substance, and effecting undersaturation of the solution by introducing into the liquid condensed solvent vapors, said vapors being condensed under such conditions as to give off latent heat to the solution, and passing the resulting undersaturated solution into and through a body of subdivided solid mixture from which the substance is separately recovered.

2. A process according to claim 1 in which a solution circulating through collections of granules of a precipitated substance and subdivided solid mixture is treated to remove suspended particles therefrom.

In testimony that I claim the foregoing as my invention, I have signed my name.

FINN JEREMIASSEN.